Figure 1:
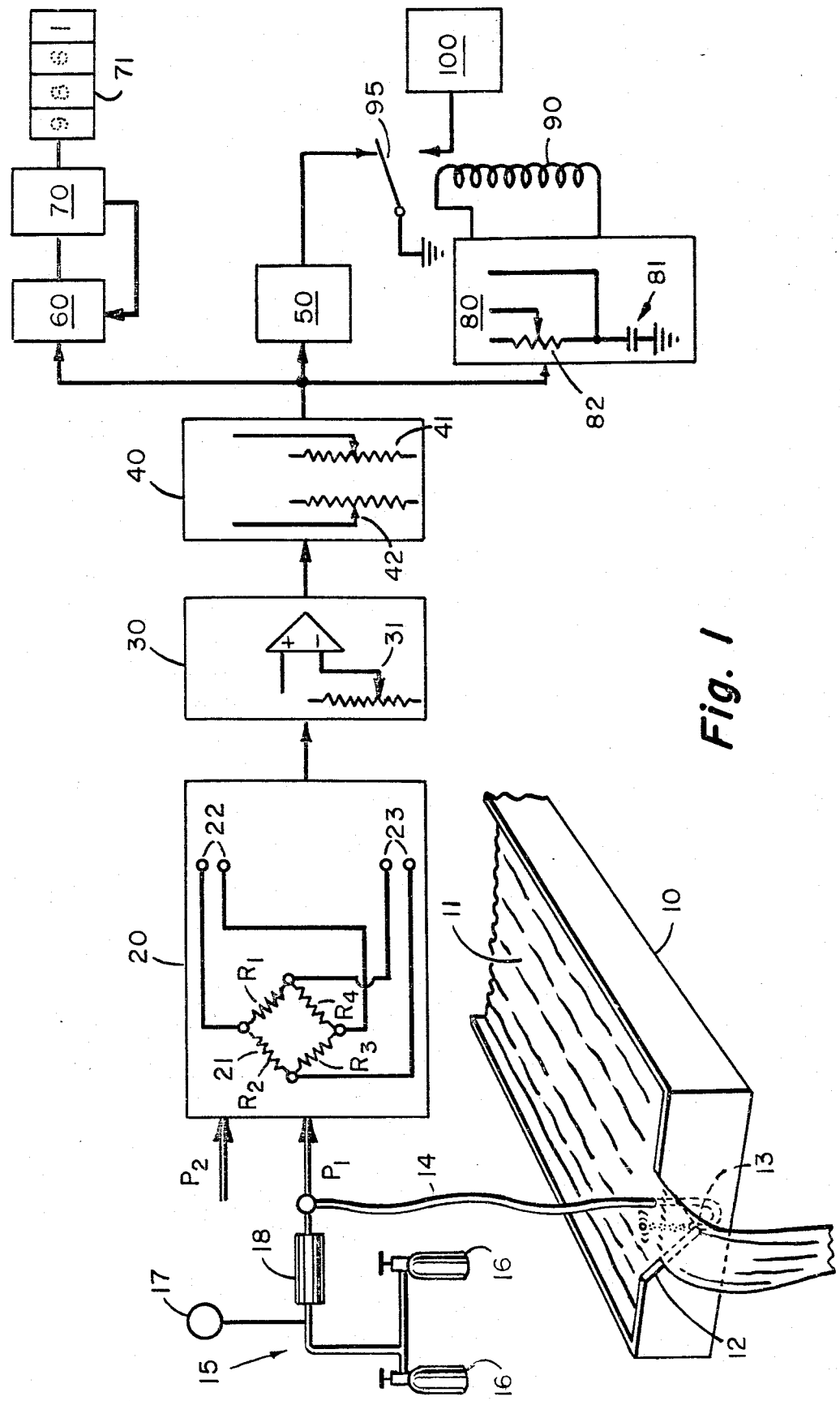

United States Patent
Kowalski

[11] 3,929,017
[45] Dec. 30, 1975

[54] FLOW MONITOR AND SAMPLE CONTROL DEVICE

[75] Inventor: William S. Kowalski, Hinsdale, Ill.

[73] Assignee: Elan Engineering Corporation, Hinsdale, Ill.

[22] Filed: Oct. 5, 1973

[21] Appl. No.: 403,841

[52] U.S. Cl. .................. 73/198; 73/215; 73/421 B; 235/151.34
[51] Int. Cl.² ............................................ G01F 1/20
[58] Field of Search .......... 73/198, 422 R, 215, 216, 73/421 B, 301, 302; 235/151.34

[56] References Cited
UNITED STATES PATENTS

| | | | |
|---|---|---|---|
| 2,153,450 | 4/1939 | Borden | 73/215 |
| 3,376,745 | 4/1968 | Davis | 235/151.34 |
| 3,476,538 | 11/1969 | Trethewey | 73/302 |
| 3,496,346 | 2/1970 | Asia et al. | 235/151.34 |
| 3,719,081 | 3/1973 | Lynn et al. | 73/198 |

Primary Examiner—S. Clement Swisher
Attorney, Agent, or Firm—Carl C. Batz

[57] ABSTRACT

A portable device and method for monitoring the flow of liquids and automatically controlling the periodic taking of samples of such liquids, said device utilizing weirs of such as Parshall flumes of various types and being sensitive to the pressure required to pass a gas through a submerged tube into liquids behind the weir, said device being operative to convert the value of such pressure to electrical values representing rate of flow and total volume over a period, and further being effective for triggering the taking of liquid samples at controlled intervals of time. The device also indicates and records the values of rate of flow, volume of liquids and the times at which samples of liquids are taken, and is capable of automatically varying the intervals at which samples are taken in accordance with increase or decrease in rate of flow.

18 Claims, 1 Drawing Figure

FLOW MONITOR AND SAMPLE CONTROL DEVICE

This invention relates to the field of pollution control and involves a device for monitoring and controlling the sampling of fluids. More particularly the invention relates to such a device which will give an accurate and continuing indication of the rate of fluid flow and which will time the frequency at which samples of fluid are taken. The device also satisfies the function of indicating the total flow of liquid over a period, and indicating also the times at which samples are taken.

BACKGROUND

It has come to be important to know the character and rates of flow and the quantities of liquids being discharged into waste disposal systems such as institutions, including industrial plants, hospitals etc.. To obtain such information it was at first the practice to manually take samples of the liquid at certain intervals such as every hour over a twenty-four hour period. Later, automatic devices were developed which could be set at or in manholes and could be set to operate at timed intervals. These sampling devices are able to mechanically take samples of the liquid and either gather the composite of the samples taken during a test period or gather separate samples which can later be separately analyzed as to composition.

However, there has not been to my knowledge any practical way for automatically obtaining information as to the rate of flow of the liquids or for indicating and recording the accumulated quantity of liquids which pass during the period of a test.

Attempts have been made to obtain such information by manually measuring the height of the flowing liquid using a scale, and from this mathematically calculating the rate of flow. Some attempts have utilized the pressure of the waterhead, measuring the pressure by mechanical means, and then from this information mathematically calculating the flow at the time the pressure is taken. But such attempts have not satisfied the practical need for indicating automatically the needed information about rates and quantities of flow over a testing period, nor have they been sufficiently accurate to enable the collection of significant data.

The art has needed a device, particularly a portable device, which could easily be carried from one location to another, and which would accurately indicate the rate of flow of the liquid over the test period. It is desired also to register the total volume of liquid over the period and to indicate the times at which samples are taken. It is further desired that the device trigger the taking of the samples at spaced intervals with the samples being taken more frequently during periods of greater flow and less frequently during periods of lesser flow.

The art needs a device which is not dependent upon the operation of mechanical elements, these elements being always subject to wear and misalignment. Further, a device is needed which can be easily set up by non-skilled operating personnel.

Accordingly, I have set out to discover methods of obtaining such information in a practical way and to provide an instrument which can be utilized for this purpose.

An embodiment of the invention is illustrated schematically by the block diagram set forth in FIG. 1 of the accompanying drawing.

As illustrated in FIG. 1, the invention contemplates a weir box 10 through which the liquid 11 may flow and having a weir opening 12 which as shown is V-shaped having an angle of 45°. However, it is understood that the weir with which my device is utilized may be of other and different shapes and may have different angles. My device is adjustable to accomodate weirs of such differing shapes instead of the particular weir as shown in FIG. 1. With reference to the weir the lowest point of the opening is called the throat of the weir and I have designated this by the character 13 in FIG. 1.

A dip tube 14 has its lower end extending into the weir box with its tip being at least as low as the throat of the weir. Connected to the upper end of the dip tube is a gas supply device 15 which includes cylinders 16, a gauge 17 and a capillary element 18. The gas may be any available pressurized inert gas such as the mixture sold under the code R-12. When the valve on one of cylinders 16 is open the pressure of the gas registers on gauge 17, the gas flows through the capillary opening and is reduced to a lower desired pressure which is applied to the dip tube 14. Gas flows at a constant rate to the lower end of the dip tube and issues in a stream from the lower end of the tube and bubbles to the surface of the liquid. The back pressure of the gas being passed through the tube is proportional to the head of liquid between the lower end of the tube and the surface of the liquid. It is necessary only that the pressure at the tube be sufficient to cause the gas to issue from the end of the tube at a substantially constant rate of flow.

The pressure of the gas being fed into the dip tube ($P_1$) is shown in FIG. 1 to be impressed on an electronic transducer which, in the drawing, is represented by the large block designated 20. Also impressed upon the electronic transducer is the pressure of the atmosphere ($P_2$), and the difference between $P_1$ and $P_2$ is utilized in the transducer in a way which will now be explained.

The transducer 20 has a pressure sensitive diaphragm formed by etching the back surface of a thin silicon die in a defined area until a thickness of only a mil or two remains. A piezoresistive strain gauge bridge 21, diagramatically illustrated in the drawing, is diffused into the front surface of the sensitive diaphragm. Input power of the bridge is supplied at terminals 22, and terminals 23 represent the output.

The bridge includes resistances $R_1$, $R_2$, $R_3$ and $R_4$, and even slight variation of $R_1$ due to diaphragm action by reason of the difference between $P_1$ and $P_2$ operates to unbalance the bridge and to produce a voltage at the output 23. The value of this voltage is directly proportional to this difference in pressure.

Resistors $R_2$ and $R_3$ serve to compensate the transducer for possible drift due to ambient temperature changes.

The voltage output of the transducer is fed to a differential amplifier 30 which, through the variable resistance element 31, can function to reduce the voltage output of the amplifier to the extend that this voltage becomes zero when the height of the liquid above the throat of the weir is zero. This, in effect, removes from the voltage output signal the effect due to having the lower end of the dip tube below the throat of the weir, and the pütput of the amplifier is directly proportional to the height of the liquid above the throat of the weir.

The voltage output of the differential amplifier 30 is fed into a multi-function logarithmic amplifier which is designated 40 in FIG. 1. This amplifier is of a type having an element 41 which contributes to the output of the amplifier a logarithmic function, and an element 42 which contributes a straight multiplying function.

At this point I may explain that the formula for converting the height of the liquid flowing over a weir to rate of flow in volume per unit time is $$F = Kh^m$$

where

F is a volume per unit time (such as millions of gallons per day or cubic feet per second), K is a constant for a particular weir, h is a height of liquid above the throat of the weir, and m is a constant for a particular shaped weir.

The values of K and m are well known to the art for weirs of any general shape. For example, for a V-shaped weir of 60°, the values of K and m are respectively 0.933 and 2.5; for a V-shaped weir of 45° the values of K and m are respectively 0.669 and 2.5, and for a one foot wide square weir with a flat bottom and vertical edges the values of K and m are respectively 2.15 and 1.5. In setting the instrument for a test the operator needs only to set the element 42 at the values given for K in any handbook of this art for the type of weir being used at the time, and set the element 41 at the value given for m in a handbook for the type of weir being used. This results in an output voltage or signal which represents the rate of flow, F, of the above formula in terms, for example, of millions of gallons per day, and the value of the voltage represents the rate of flow in a linear fashion.

It may also be pointed out that the constants K and m may both be set to a value of 1 in which case the instrument will read out directly in liquid level with units of feet, for example. Such operation would be desirable when the level changes in ponds, lakes, rivers or streams need to be measured and recorded.

The output of the function amplifier 40 is connected to a recorder 50 which preferably is of the type which keeps a continuous record. The record may have a rotating cylinder bearing a graph sheet so that a needle sensitive to the signal input to the recorder marks on the graph sheet a continuous record of the value of the input voltage during the period of the test. Calibration on the sheet may be in millions of gallons per day for example.

The output function amplifier 40 is also connected to an integrator circuit which is designated 60 in the drawing and which registers what amounts to the area under a rate of flow-time curve, and this represents volume. The output of integrator 60 may be fed to a counter device 70 which may be a self resetting Schmitt trigger device, the total volume count since the beginning of the test being indicated in the indicating device 71, which may be calibrated in gallons, thousands of gallons, or millions of gallons.

The output of the function amplifier 40 is also connected to a timer circuit 80. In the circuit of this timer device 80 is a condenser 81 and a variable resistor 82. The electrical charge which is fed from the function amplifier passes through the resistor 82 and builds up on the condenser 81 until, in accordance with design, a charge is reached which causes the condenser to discharge. A solenoid 90 connected with a timing device becomes energized upon such discharge and operates the switch 95 to close contacts which trigger a signal to the sampling device 100, causing that device to take a sample of the liquid being investigated. A detailed explanation of the operation of the automatic sampling device 100 is not deemed necessary since such devices are available and known to the art, it being sufficient to say that such sampling device is operable to take a sample upon receipt of a signal which is produced when switch 95 is operated.

It is another feature of my device that the switch 95 is spring biased and after solenoid 90 is relaxed after discharge of condenser 81 the switch 95 assumes its normal position in which it is shown in the drawing. The switch is also in the circuit connecting the recorder to ground, this circuit being closed in the normal operation of the recorder. However, when switch 95 is momentarily operated through acuation of the solenoid 90 this operates to open the recorder circuit to ground, thus causing the needle of the recorder to go to zero for an instant. This marking by the recorder serves to record the fact that a sample of liquid was taken and also the time when it was taken.

Referring again to the timer device 80 the interval between times a signal is given to take a sample may be changed by varying the resistor 82 so that with a given strength of electrical potential being delivered to the timer the rate at which a charge is delivered to condenser 81 can be increased or decreased.

Further, it is an important feature of the invention that without regard to adjustment by resistor 82, the frequency at which samples are taken will vary automatically depending on whether the output potential from the function amplifier is greater or lesser. If the output at the function amplifier is greater the condenser will sooner reach the charge which triggers this discharge thus causing samples to be taken more frequently and if the function amplifier output is lesser the condenser will, after a greater interval, reach a charge which triggers its discharge thus causing samples to be taken less frequently. This is desirable because when the flow of liquid is greater it is more important to have a greater number of samples, and when flow is very light, sampling is of far less significance and fewer samples need be taken.

It is a further advantage that the dip tube and each of the elements illustrated in FIG. 1, excepting the weir and the sampler 100, may be mounted in a handcase, and easily carried from location to location as may be needed in the course of a testing program. Furthermore, the simplicity of the instrument allows it to be quickly set up and placed into operation by a non-skilled test operator.

The test operator may take his handcase containing the instrument above described along with a case containing the sampler, to a test location such as a designated manhole, hang up his portable cases, place the tube 14 in the liquid behind the weir, set his values of K and m to correspond with the known constants for the type of weir at that location, set the recorder in operation, open the gas valve, and then leave, returning in 24 hours, or at the end of the test period, to pick up the record sheet.

In the foregoing detailed description, it has not been deemed necessary to describe the power for operating the electrical elements. Such power may be supplied by the inclusion of a small battery, or if desired, may be supplied in accordance with the knowledge of this art from a 115 or 230 volt A.C. line.

While only one embodiment of the invention has been described in the foregoing detailed description, it is understood that many changes may be made in accordance with the knowledge of this art, all within the spirit of the invention and the scope of the apended claims.

I claim:

1. Apparatus for indicating rate of flow of a fluid comprising a weir arranged to receive said liquid thereover, a dip tube having its outlet end extended below the level of said liquid behind said weir at least to the depth of the throat of the weir, means for feeding at the other end of said tube a gas under pressure so that said gas is caused to pass in a continuous stream from the outlet end of said tube into said liquid, an electronic transducer sensitive to gas pressure when impressed thereon and which yields an output voltage proportional to said pressure, means for impressing upon said transducer the pressure of said gas which is passed through said tube, a function amplifier having a logarithmic function element set at a value of at least 1.0 and which is a constant for the shape of said weir, means connected with the output of said transducer for impressing upon said amplifier a voltage which is proportional to the output voltage of said transducer, and means connected to the output of said amplifier for indicating a value proportional to the output voltage of said amplifier.

2. Apparatus as set forth in claim 1 wherein said amplifier has also a linear function element which is set at a value which is constant for the shape of said weir.

3. Apparatus as set forth in claim 1 including a liquid sampling device actuatable upon receipt of a signal for taking a sample of said liquid, and means connected with the output of said function amplifier for delivering said signal to said sampling device when a predetermined charge has been received from said function amplifier.

4. Apparatus as set forth in claim 3 wherein said indicating means is responsive to said signal and is effective for indicating when said sampling device is operated to take a sample of liquid.

5. Apparatus as set forth in claim 4 wherein said means for delivering a signal includes a switch device, and means responsive to the operation of said switch for actuating said indicating means to indicate the taking of a sample of liquid.

6. Apparatus as set forth in claim 3 wherein said last mentioned means has an adjustable element for varying said charge.

7. Apparatus as set forth in claim 1 including a differential amplifier connected between said transducer and said function amplifier, said differential amplifier being biased to produce zero voltage when the level of said liquid is at the throat of said weir.

8. Apparatus as set forth in claim 1 wherein said indicating means is a recorder and capable of making a continuing record of the values proportional to the output of said function amplifier over a predetermined period.

9. Apparatus as set forth in claim 8 wherein said recorder has a record sheet which is calibrated to indicate unit volume of liquid flow during a unit period.

10. A method for making a record of the rate of flow of a flowing liquid comprising passing said liquid over a weir, discharging a gas in a constantly flowing steam into said liquid behind said weir at a point at least as low as the throat of said weir, and impressing the pressure of said gas on an electronic transducer which is sensitive to such pressure for converting the value of said pressure to an electrical potential, amplifying said potential by a logarithmic factor which is at least 1.0 and corresponds with the shape of said weir, and recording said amplified potential to produce a record indicating the rate of flow of said liquid over a time period.

11. Apparatus as set forth in claim 3 in which said last mentioned means includes a condenser of the type which discharges when its charge reaches a predetermined value, and in which said signal is given upon the discharge of said condenser.

12. Apparatus as set forth in claim 5 in which said signal delivering means includes a condenser and in which said switch and said sampling device are each actuated by discharge of said condenser.

13. In a device for recording the rate of flow in a liquid stream and for taking samples of the liquid, means sensitive to rate of flow of said liquid for producing an electrical signal which is proportional to said rate, recorder means sensitive to said signal for recording the value of said rate over a period of time, said recorder means having a circuit by which it is energized and being operable when said circuit is closed, means sensitive to the energy of said signal over a time period for taking a sample of said liquid and means for interrupting said recorder circuit when a sample is taken whereby to indicate on the record made by said recorder the time when a sample is taken.

14. A device as set forth in claim 13 in which said interrupting means includes a switch in said recorder circuit and means for operating said switch to open said circuit when a sample is taken.

15. A device as set forth in claim 14 in which said means for taking a sample includes a solenoid which is energized when a sample is taken and wherein said solenoid when energized operates said switch to open said recorder circuit.

16. A device as set forth in claim 14 wherein said switch is spring biased toward closing of said circuit and wherein said means for operating said switch is momentarily operable upon the taking of a sample and after operation relaxes to allow said spring-biased switch to again close said recorder circuit.

17. A method for monitoring a flowing liquid comprising passing said liquid over a weir, discharging a gas in a constantly flowing stream into said liquid behind the weir at a point at least as low as the throat of said weir, impressing the pressure of said gas on an electric transducer which is sensitive to such pressure for converting the value of said pressure to an electrical potential which is proportional to the height of said liquid, amplifying said potential, and when said amplified potential is obtained for a time sufficient to produce an electric charge of a predetermined amount taking a sample of said liquid and recording the time at which the sample is taken.

18. The method of claim 17 including the step of recording during a predetermined period and on the same record the value of said voltage and the time when said sample is taken.

* * * * *